US012640306B2

(12) United States Patent
Yan et al.

(10) Patent No.: US 12,640,306 B2
(45) Date of Patent: May 26, 2026

(54) ELECTRONIC DEVICE

(71) Applicant: BOURNS, INC., Riverside, CA (US)

(72) Inventors: Ian Yan, Xiamen (CN); Windy Huang, Xiamen (CN); Larry Gao, Xiamen (CN); Bohr Wan, Xiamen (CN)

(73) Assignee: Bourns, Inc., Riverside, CA (US)

( * ) Notice: Subject to any disclaimer, the term of this patent is extended or adjusted under 35 U.S.C. 154(b) by 838 days.

(21) Appl. No.: 17/933,784

(22) Filed: Sep. 20, 2022

(65) Prior Publication Data

US 2024/0096548 A1 Mar. 21, 2024

(51) Int. Cl.

| | |
|---|---|
| ***H01F 27/34*** | (2006.01) |
| ***H01F 27/24*** | (2006.01) |
| ***H01F 27/28*** | (2006.01) |
| ***H01F 41/02*** | (2006.01) |
| ***H01F 41/04*** | (2006.01) |

(52) U.S. Cl.

CPC ........... *H01F 27/346* (2013.01); *H01F 27/24* (2013.01); *H01F 27/2804* (2013.01); *H01F 41/0206* (2013.01); *H01F 41/041* (2013.01); *H01F 2027/2809* (2013.01)

(58) Field of Classification Search

CPC ......... H01F 27/2804; H01F 2027/2809; H01F 17/0013; H01F 17/0006; H01F 5/003; H01F 27/29; H01F 27/292; H01F 27/346; H01F 27/24; H01F 41/0206; H01F 41/041

USPC .................................................. 336/200, 232

See application file for complete search history.

(56) References Cited

U.S. PATENT DOCUMENTS

| | | | | |
|---|---|---|---|---|
| 4,873,757 | A * | 10/1989 | Williams | H01F 17/0013 29/852 |
| 6,069,548 | A | 5/2000 | Baarman et al. | |
| 6,211,767 | B1 | 4/2001 | Jitaru | |
| 6,970,023 | B2 | 11/2005 | Fedigan | |
| 7,446,637 | B1 | 11/2008 | Liang et al. | |
| 7,671,714 | B2 | 3/2010 | Temeijer | |

(Continued)

FOREIGN PATENT DOCUMENTS

| | | |
|---|---|---|
| CA | 2823945 A1 | 7/2012 |
| CN | 111145990 A | 5/2020 |

(Continued)

OTHER PUBLICATIONS

International Search Report and Written Opinion received in PCT Application No. PCT/US2373862 dated Mar. 15, 2024 in 16 pages.

(Continued)

*Primary Examiner* — Tszfung J Chan

(74) *Attorney, Agent, or Firm* — Knobbe, Martens, Olson & Bear, LLP

(57) ABSTRACT

An electronic device is disclosed. The electronic device can include a core having a top core section and a bottom core section, a laminate substrate, where the laminate substrate having a void through which the top and bottom core sections are connected, and the laminate substrate having conductive traces. The electronic device can further include a base having a first side including a recess and a second side opposite the first site, at least one of the core and the laminate substrate disposed in the recess of the base, where the base has one or more terminals on the second side to electrically connect to an external device.

17 Claims, 5 Drawing Sheets

(56) References Cited

U.S. PATENT DOCUMENTS

| | | | |
|---|---|---|---|
| 7,821,374 B2 | 10/2010 | Harrison et al. | |
| 7,884,692 B2 | 2/2011 | Yen et al. | |
| 8,013,708 B2 | 9/2011 | Tsai | |
| 8,736,411 B2 | 5/2014 | Yen | |
| 9,160,050 B2 | 10/2015 | Cammarata | |
| 9,396,865 B1 | 7/2016 | Folker et al. | |
| 9,824,810 B2 * | 11/2017 | Eom | H01F 27/24 |
| 10,141,107 B2 | 11/2018 | Lee et al. | |
| 10,178,787 B2 | 1/2019 | Francis | |
| 10,290,917 B2 | 5/2019 | Cammarata | |
| 10,903,546 B2 | 1/2021 | Cammarata | |
| 2002/0070834 A1 * | 6/2002 | Dadafshar | H01F 17/0013 336/200 |
| 2004/0240126 A1 | 12/2004 | Tiemeijer | |
| 2005/0134357 A1 | 6/2005 | Fedigan | |
| 2006/0082431 A1 * | 4/2006 | Estrov | H01F 27/2804 336/192 |
| 2009/0002111 A1 | 1/2009 | Harrison et al. | |
| 2011/0148563 A1 | 6/2011 | Tsai | |
| 2012/0176214 A1 | 7/2012 | Hsiao | |
| 2013/0278371 A1 * | 10/2013 | Hongzhong | H01F 27/2871 336/232 |
| 2013/0321117 A1 | 12/2013 | Park et al. | |
| 2014/0022027 A1 | 1/2014 | Cammarata | |
| 2014/0022042 A1 | 1/2014 | Park et al. | |
| 2014/0347154 A1 | 11/2014 | Schmelzer et al. | |
| 2015/0101854 A1 | 4/2015 | Lee et al. | |
| 2015/0380801 A1 | 12/2015 | Cammarata | |
| 2016/0088754 A1 | 3/2016 | Francis | |
| 2018/0131070 A1 | 5/2018 | Cammarata | |
| 2019/0019618 A1 | 1/2019 | Fukui et al. | |
| 2019/0080836 A1 | 3/2019 | Yasuda et al. | |
| 2019/0122814 A1 | 4/2019 | Hung | |
| 2020/0203053 A1 | 6/2020 | Scholz | |

FOREIGN PATENT DOCUMENTS

| | | | |
|---|---|---|---|
| CN | 113270260 | A | 8/2021 |
| CN | 214705721 | U | 11/2021 |
| CN | 114121465 | A | 3/2022 |
| CN | 114974834 | A | 8/2022 |
| DE | 202020107518 | U | 2/2021 |
| EP | 1536436 | A1 | 6/2005 |
| EP | 1417691 | B1 | 12/2009 |
| EP | 2370981 | B1 | 10/2012 |
| EP | 2712082 | A1 | 3/2014 |
| EP | 2712082 | B1 | 1/2015 |
| EP | 1536436 | B1 | 1/2017 |
| GB | 2530321 | A | 3/2016 |
| TW | 202223936 | A | 6/2022 |
| WO | WO 2003/015110 | A1 | 2/2003 |
| WO | WO 2008/088682 | A2 | 7/2008 |
| WO | WO 2008/088682 | A3 | 7/2008 |
| WO | WO 2010/065113 | A1 | 6/2010 |
| WO | WO 2012/094354 | A2 | 7/2012 |
| WO | WO 2012/094354 | A3 | 7/2012 |
| WO | WO 2014/189771 | A1 | 11/2014 |

OTHER PUBLICATIONS

Office Action in Taiwan Patent Application No. 112135277 dated Aug. 5, 2024 in 25 pages.

* cited by examiner

ELECTRONIC DEVICE

BACKGROUND

Field of the Invention

The field relates to an electronic device, and in particular, to a signal planar transformer including a core, a laminate substrate with conductive traces, and a base.

Description of the Related Art

Various electronic devices (e.g., signal transformers), utilize a ring core wound with copper wire which may lead to a longer manufacturing process time and may be less reliable. These devices are typically assembled into a case, adding additional time in the assembly process. Further, these devices are typically buried into laminate substrates thus requiring longer manufacturing times. Accordingly, there remains a continued need for an improved signal transformer.

SUMMARY

In one embodiment, an electronic device is disclosed. The electronic device can include a core having a top core section and a bottom core section, a laminate substrate, where the laminate substrate having a void through which the top and bottom core sections are connected, and the laminate substrate having conductive traces. Further, the electronic device can include a base having a first side including a recess and a second side opposite the first side, such that at least one of the core and the laminate substrate can be disposed in the recess of the base, and where the base has one or more terminals on the second side to electrically connect to an external device.

In another embodiment, an electronic device can include an electrical component and a base having a first side and a second side opposite the first side, such that the electrical component can be coupled to the first side of the base. The base can have one or more terminals on the second side to electrically connect to a substrate and can be configured for surface mounting on to the substrate.

In another embodiment, a method of manufacturing an electronic device is disclosed. The method can include fitting a top core section and a bottom core section through void of a laminate substrate and around the periphery of the laminate substrate, connecting the top and bottom core sections to each other, mounting at least one of the core and laminate substrate into a recess on a first side of a base, and connecting one or more terminals on a second side opposing the first side of the base to an external device.

These, as well as other components, steps, features, objects, benefits, and advantages, will now become clear from a review of the following detailed description of illustrative embodiments, the accompanying drawings, and the claims.

DETAILED DESCRIPTION

Conventional signal transformers have several disadvantages. Such disadvantages include long and complex manufacturing processes, low reliability, and that the signal transformer can be damaged, for example, when the wires are thermally shocked and/or mechanically scraped. Another problem is that conventional coils of signal transformers are typically assembled into a case which can cause the outside surfaces of the coil to be removed. Further, conventional signal transformers are also typically buried into the top surface of a substrate which can cause the removal of the top surface and a recess to be made into the substrate. Accordingly, there is a continued demand for an improved signal transformer that is simpler and more efficient to manufacture with higher reliability and durability.

Figure 1:
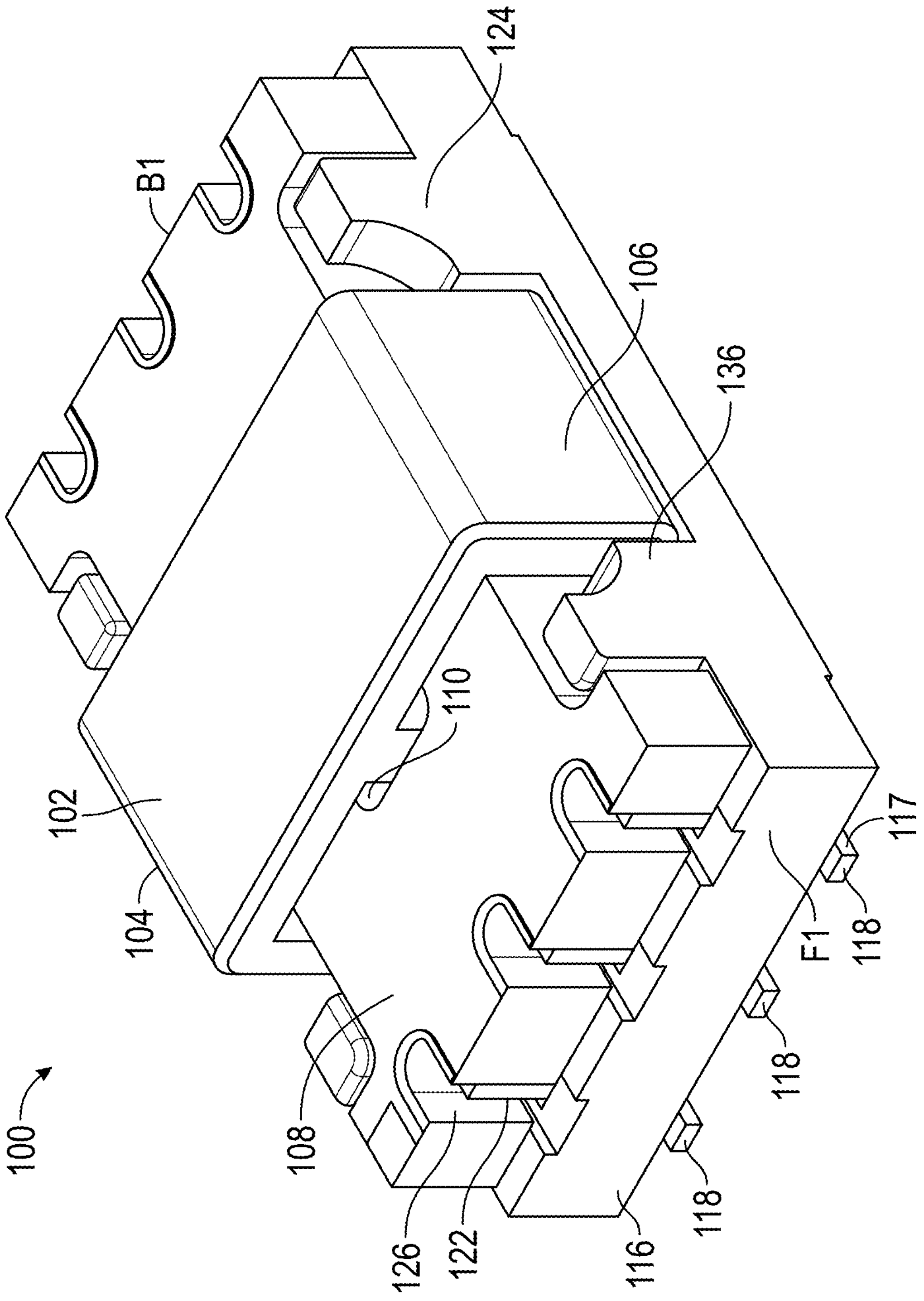
FIG. 1 is a schematic perspective view of a partially-assembled electronic device, according to various embodiments.
Figure 2:
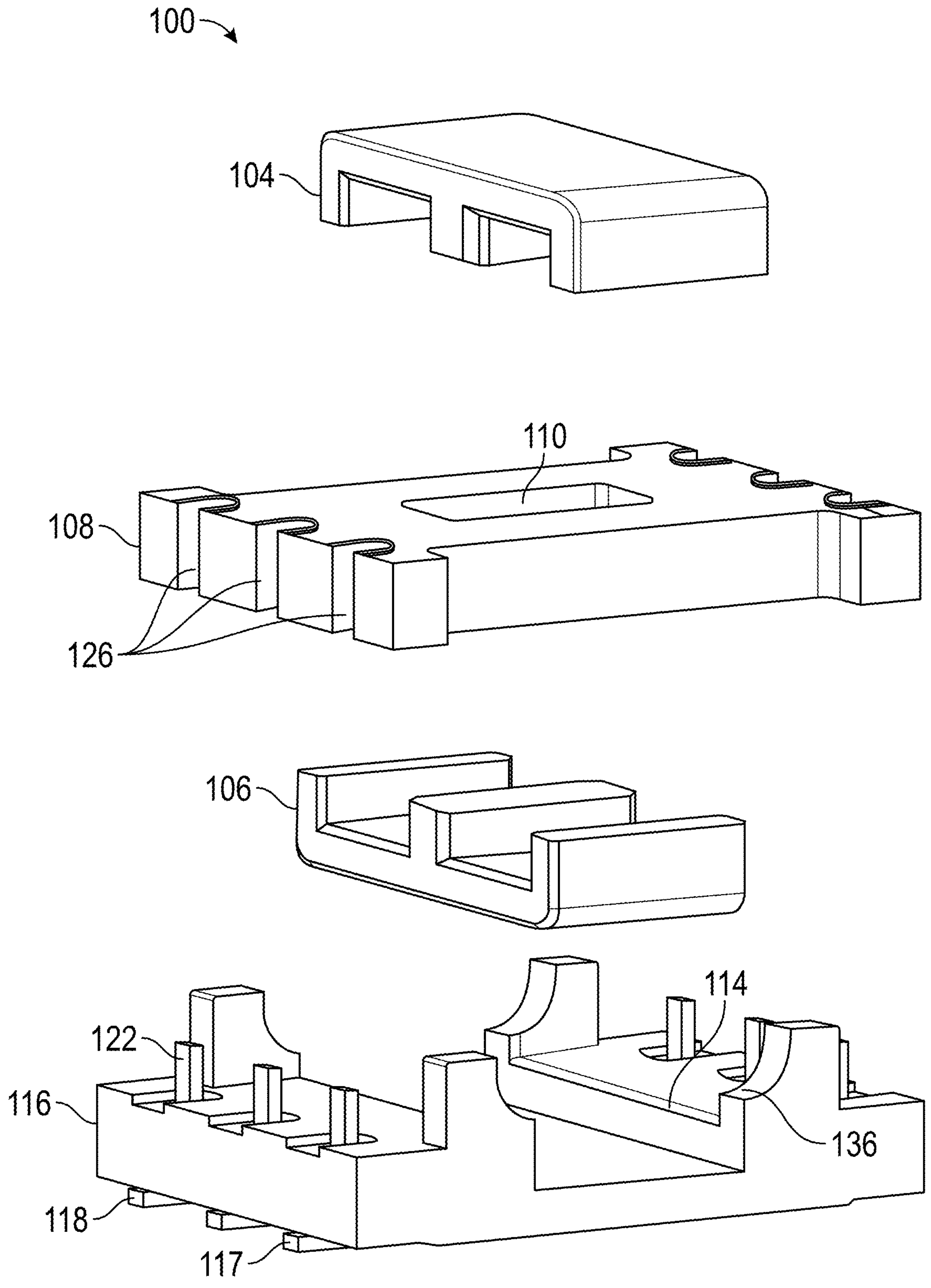
FIG. 2 is a schematic perspective exploded view of a partially-assembled electronic device before the components are assembled on the base.
Figure 3:
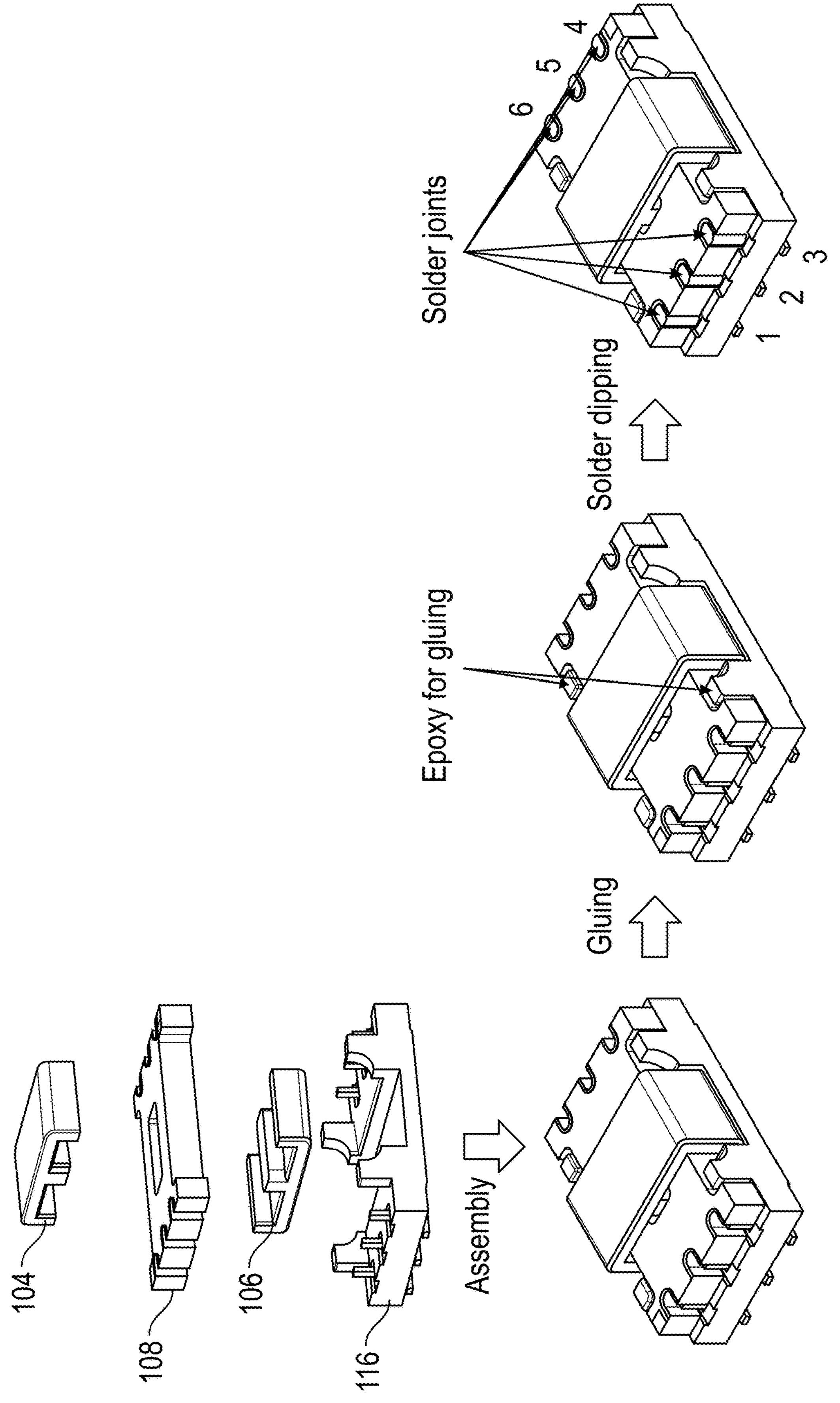
FIG. 3 illustrates an assembly process for forming the signal transformer of FIGS. 1-2.
Figure 4:
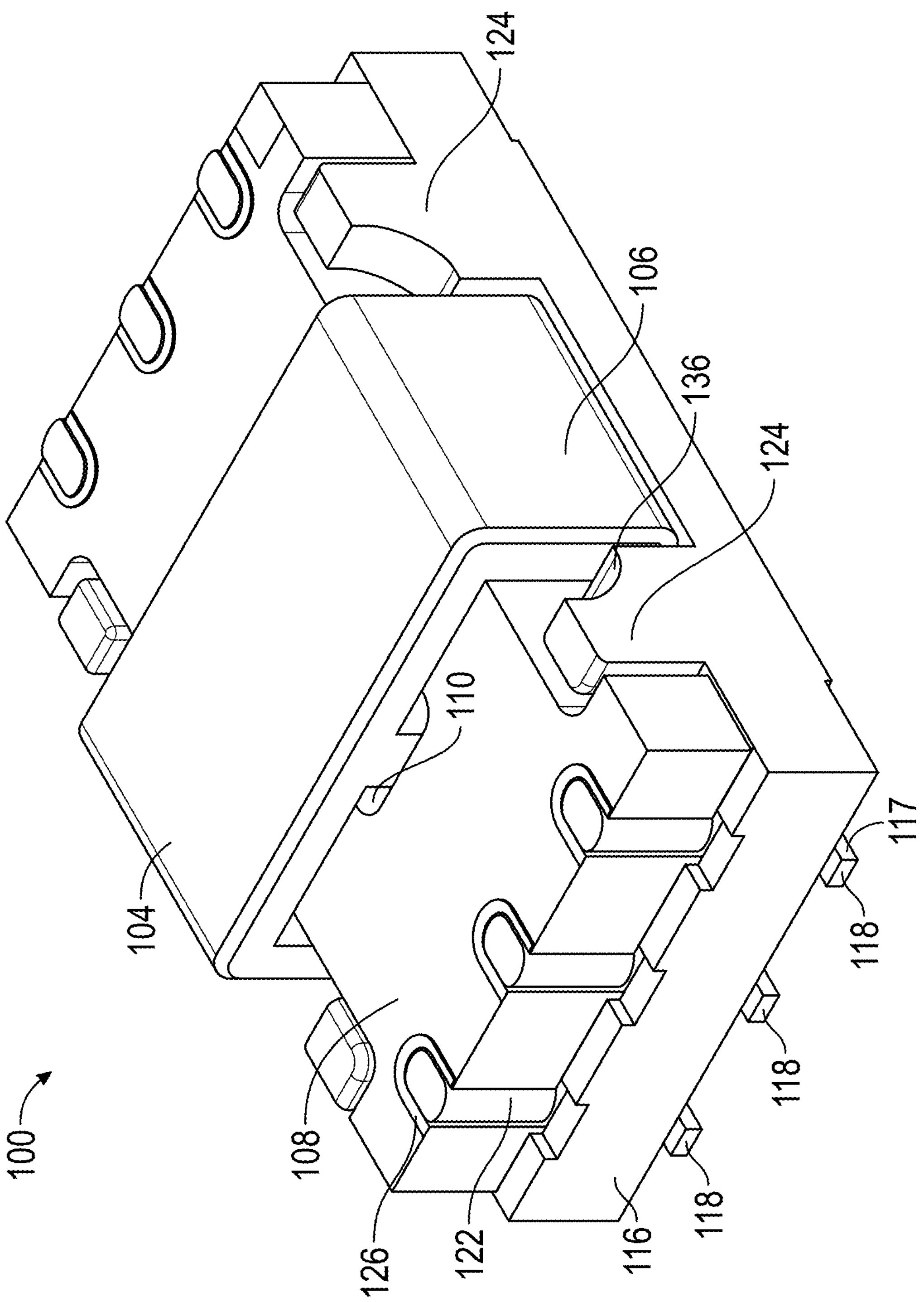
FIG. 4 is a schematic perspective view of an assembled electronic device of FIGS. 1-3, according to various embodiments.

FIGS. 1-4 illustrate schematic perspective views of a partially-assembled electronic device (FIG. 1), a partially exploded view of a partially-assembled electronic device before the components are assembled on the base (FIG. 2), an assembly process for forming an electronic device (FIG. 3), and a schematic perspective view of an assembled and soldered electronic device of FIGS. 1-3 (FIG. 4), according to various embodiments. FIG. 1 illustrates a partially assembled electronic device 100 that includes a core 102 comprising a top core section 104 and a bottom core section 106, the core 102 serving as the core of the electronic device, a laminate substrate 108 in which the laminate substrate 108 has a void 110 through which the top core section 104 and the bottom core section 106 are connected, and a base 116. In various embodiments, the core 102 can comprise a ferrite core material. The core 102 can comprise an EE core, an EI core, and/or any type of similar core. The base 116 can be configured so that the partially assembled electronic device 100 can be surface mounted to an external device, such as a laminate substrate or PCB, rather than embedding the electronic device into a recess or hole in the external device. The electronic device 100 can comprise a transformer (such as a signal planar transformer), an inductor, or any other suitable type of electronic device. The core 102 can comprise an EE core, which includes two E-shaped core sections configured to connect to one another.

Figure 5:
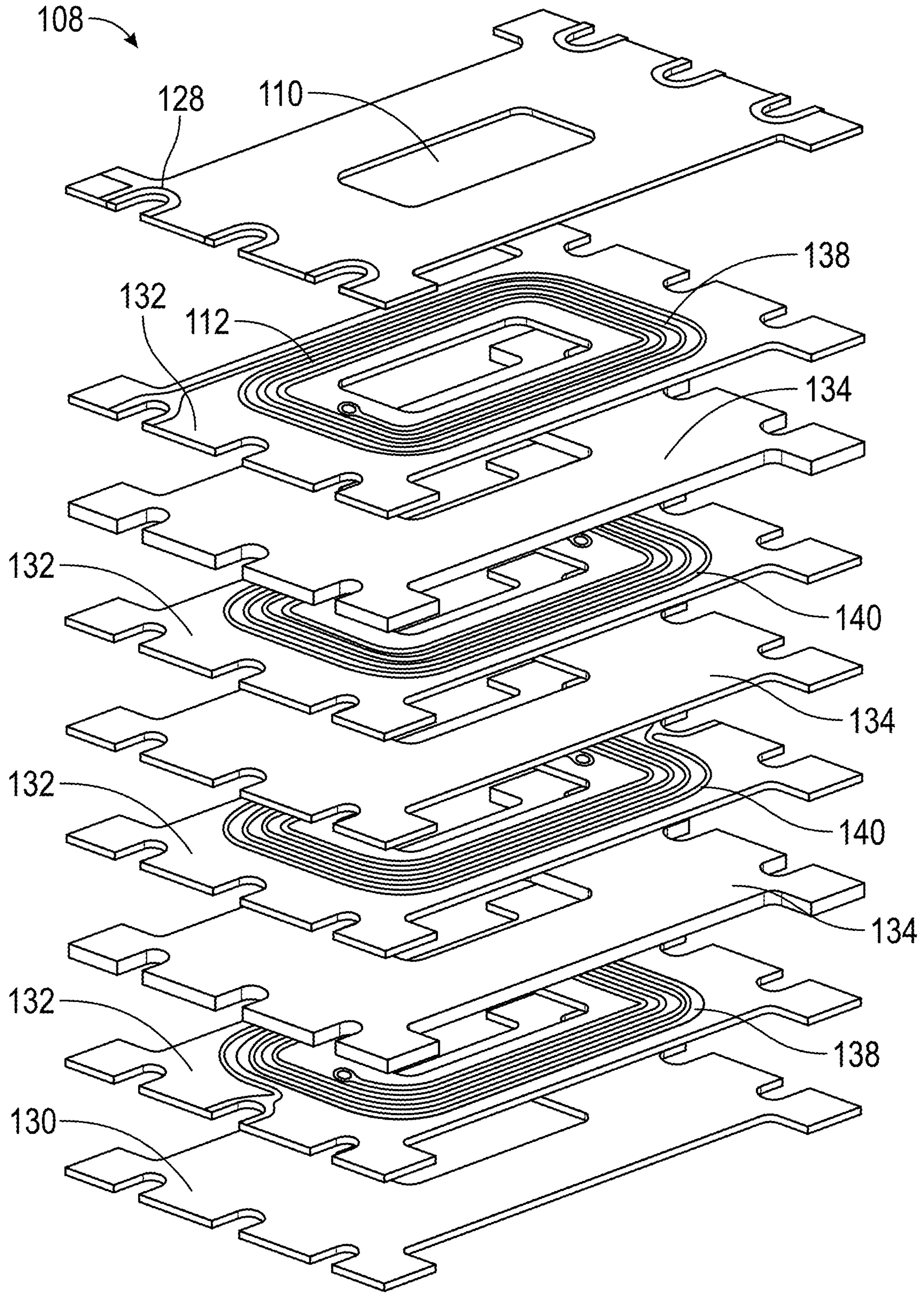
FIG. 5 is a schematic perspective exploded view of the laminate substrate of FIGS. 1-4.

The laminate substrate 108 can comprise a multi-layered substrate having insulating layers patterned with conductive traces 112 (see FIG. 5). The laminate substrate 108 can comprise a printed circuit board (PCB), a ceramic substrate, or any other suitable laminate. The base 116 can serve as a body to which the core 102 and/or laminate 108 can be mounted. In some embodiments, the core 102 and laminate substrate 108 can be disposed into a recess 114 of the base 116. Although a recess is shown in FIGS. 1-4, in other embodiments, there can be no recess, or the base 116 can have any other suitable shape, including a suitably shaped mounting surface to which the core and/or laminate can be mounted.

The base 116 can comprise an insulating material, for example, but not limited to, a molded insulating material (e.g., a molded epoxy such as Diallyl Phthalate (DAP) Molding Compound). The base 116 can have one or more pins 117, for example L-type pins, comprising corresponding terminals 118 and vertical terminal leads 122. Terminal 118 can be disposed on an opposite side from the core 102 and laminate substrate 108 to electrically connect to an external device. In some embodiments, pins 117 can be disposed on a front side F1 and a back side B1 opposite of the front side F1 of the base 116. The core 102 and laminate substrate can then be coupled to both the pins 117 of the front side F1 and the pins 117 located on the back side B1 of the base 116. The external device can comprise any suitable type of device, e.g., a package substrate, such as a printed circuit board (PCB), ceramic substrate, lead frame substrate, etc.

In some embodiments, the core 102 and the laminate substrate 108 can be disposed into the recess 114 of the base 116 and attached by epoxy or another an adhesive to positioning columns 124 of the base 116. The positioning columns 124 may include an arc opening 136 for dispensing epoxy or another adhesive to attach the base 116, laminate substrate 108, and core 102. The arc opening 136 on the positioning columns 124 can allow the epoxy or adhesive to gather at the joint of the core 102, The conductive traces 112 (see FIG. 5) of the laminate substrate 108 can comprise copper or another conductive material. The conductive traces can be formed in multiple layers of the laminate substrate 108 and can comprise annular structures disposed about the void 110. The use of conductive traces patterned in the laminate substrate 108 can simplify processing as compared to devices that utilize a wire winding, as found in other transformers. The use of conductive traces 112 in the laminate substrate 108 can provide greater reliability in preventing broken wire in wire windings. Further, the use of insulation prepreg 134 in the laminate substrate 108 can assist in making the hi-pot performance more reliable. Hi-pot testing, also known as dielectric strength testing, determines the electrical insulation adequacy in devices and assemblies for the overvoltage transient. That is, hi-pot testing can comprise a high-voltage test that is applied to all devices for a specific time in order to ensure adequate insulation. The conductive traces 112 can have a width in a range of 0.10 mm to 0.30 mm, in a range of 0.125 mm to 0.275 mm, in a range of 0.15 mm to 0.25 mm, in a range of 0.175 mm to 0.225 mm, or in a range of 0.19 mm to 0.21 mm. The conductive traces 112 can also have a thickness in a range of 0.01 mm to 0.05 mm, in a range of 0.015 mm to 0.045 mm, in a range of 0.02 mm to 0.04 mm, in a range of 0.025 mm to 0.035 mm, or in a range of 0.0275 mm to 0.0325 mm.

Vertical terminal lead 122 can be configured to connect the base 116 to the laminate substrate 108. In some embodiments, the base 116 can have a plurality of vertical terminal leads 122, which can correspond with the amount of pins 117, with vertical terminal leads 122 on opposing sides of the base 116 and laminate substrate 108 to connect the base 116 to the laminate substrate 108. The pin 117 can comprise an L-shaped pin, including, e.g., a vertical lead 122 and horizontal terminal 118 extending from the vertical lead 122. Vertical lead 122 and terminal 118 can be integrally formed in a unitary body such that terminal 118 can extend non-parallel from vertical lead 122. The angle measured between the terminal 118 and vertical lead 122 can be in a range of 45 degrees to 135 degrees, in a range of 80 degrees to 100 degrees, in a range of 85 degrees to 95 degrees, or in a range of 87 degrees to 93 degrees. The vertical terminal lead 122 of the base 116 can connect to the laminate substrate 108 by solder or another conductive adhesive. The laminate substrate 108 can include a notch 126 for connecting the conductive traces 112 of the laminate substrate 108 to the vertical terminal lead 122 of the base 116, which in turn connects to the terminals 118 on bottom side of the base 116. The notch 126 can be any suitable shape to provide a contact between the conductive traces 112 and the vertical terminal lead 122. In some embodiments, the notch 128 can be a semi-circular cutout plated with conductive material. In some embodiments, the one or more terminals 118 of the base 116 can be configured for surface mounting on the external device. The positioning columns 124 can assist in aligning notch 126 of the laminate substrate 108 with the vertical terminal leads 122 of base 116.

By mounting the core and a laminate substrate to a base, the electrical device can be surface mountable to an external device which facilitates easier electrical connection to external devices as compared to conventional devices. Using base 116 as a mounting surface for the core 102 and laminate substrate 108 to connect to the pins 117 on the second side of the base can provide a versatile and interchangeable device that can lessen manufacturing process time and increase reliability. The mounting surface of base 116 can provide a platform for a number of electrical components such as transformers, inductors, or any other suitable type of electronic device such that the discussed configuration allows for connectivity to the bottom of the base where pins or other leads can be located. The pins or leads can be configured and selected based on the type of application of connection to an external device.

FIG. 5 is a schematic perspective exploded view of the laminate substrate 108 including a top layer 128, a bottom layer 130, and at least one intermediate layer 132. The intermediate layers 132 of laminate substrate 108 can include conductive traces 112 comprising a primary winding 138 and a secondary winding 140. The primary winding 138 and the secondary winding 140 can surround the void 110 of the laminate substrate 108. The conductive traces 112 can originate and terminate at the notch 126 on a first side or a second side opposite the first side of the intermediate layer 132. The intermediate layers 132 may alternate in a winding structure of Primary-Secondary-Primary to reduce leakage inductance. Whether the conductive trace 112 on the first side or the second side can depend on the winding structure. In some embodiments, a prepreg insulation layer 134 may be disposed between the intermediate layers 132 of the laminate substrate 108. In some embodiments, the insulation prepreg 134 can withstand 1 kVDC to 20 kVDC (e.g., 10 kVDC), 5 kVDC to 15 kVDC, 7.5 kVDC to 12.5 kVDC, or 9 kVDC to 11 kVDC. In other embodiments, the thickness of the insulation prepreg layer can have a minimum value of 0.050 mm to 0.50 mm, 0.10 mm to 0.40 mm, 0.15 mm to 0.30 mm, 0.175 mm to 0.25 mm, or 0.19 mm to 0.21 mm.

Reference throughout this specification to "some embodiments" or "an embodiment" means that a particular feature, structure, element, act, or characteristic described in connection with the embodiment is included in at least one embodiment. Thus, appearances of the phrases "in some embodiments" or "in an embodiment" in various places throughout this specification are not necessarily all referring to the same embodiment and may refer to one or more of the same or different embodiments. Furthermore, the particular features, structures, elements, acts, or characteristics may be combined in any suitable manner (including differently than shown or described) in other embodiments. Further, in various embodiments, features, structures, elements, acts, or characteristics can be combined, merged, rearranged, reordered, or left out altogether. Thus, no single feature, structure, element, act, or characteristic or group of features, structures, elements, acts, or characteristics is necessary or required for each embodiment. All possible combinations and subcombinations are intended to fall within the scope of this disclosure.

As used in this application, the terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Language of degree used herein, such as the terms “approximately,” “about,” “generally,” and “substantially” as used herein represent a value, amount, or characteristic close to the stated value, amount, or characteristic that still performs a desired function or achieves a desired result. For example, the terms “approximately”, “about”, “generally,” and “substantially” may refer to an amount that is within less than 10% of, within less than 5% of, within less than 1% of, within less than 0.1% of, and within less than 0.01% of the stated amount. As another example, in certain embodiments, the terms “generally parallel” and “substantially parallel” refer to a value, amount, or characteristic that departs from exactly parallel by less than or equal to 10 degrees, 5 degrees, 3 degrees, or 1 degree. As another example, in certain embodiments, the terms “generally perpendicular” and “substantially perpendicular” refer to a value, amount, or characteristic that departs from exactly perpendicular by less than or equal to 10 degrees, 5 degrees, 3 degrees, or 1 degree.

The foregoing description sets forth various example embodiments and other illustrative, but non-limiting, embodiments of the inventions disclosed herein. The description provides details regarding combinations, modes, and uses of the disclosed inventions. Other variations, combinations, modifications, equivalents, modes, uses, implementations, and/or applications of the disclosed features and aspects of the embodiments are also within the scope of this disclosure, including those that become apparent to those of skill in the art upon reading this specification. Additionally, certain objects and advantages of the inventions are described herein. It is to be understood that not necessarily all such objects or advantages may be achieved in any particular embodiment. Thus, for example, those skilled in the art will recognize that the inventions may be embodied or carried out in a manner that achieves or optimizes one advantage or group of advantages as taught herein without necessarily achieving other objects or advantages as may be taught or suggested herein. Also, in any method or process disclosed herein, the acts or operations making up the method or process may be performed in any suitable sequence and are not necessarily limited to any particular disclosed sequence.

What is claimed is:

1. An electronic device comprising:

a core comprising a top core section and a bottom core section;

a laminate substrate, the laminate substrate having a void through which the top and bottom core sections are connected, the laminate substrate having conductive traces;

a base having a first side including a recess and a second side opposite the first side, at least one of the core and the laminate substrate disposed in the recess of the base, the base having one or more terminals on the second side to electrically connect to an external device;

wherein the base has at least one vertical terminal lead configured to connect the base to the laminate substrate; and wherein the laminate substrate has a notch for connecting the at least one vertical terminal lead of the base to the laminate substrate.

2. The electronic device of claim 1, wherein the electronic device comprises at least one of a transformer, an inductor, and any other suitable type of electronic device.

3. The electronic device of claim 1, wherein intermediate layers of the laminate substrate alternate in a winding structure of Primary-Secondary-Primary to reduce leakage inductance.

4. The electronic device of claim 1, wherein the base has six vertical terminal leads, three vertical terminal leads each on a first and second opposing side of the base, to connect the laminate substrate to the base.

5. The electronic device of claim 1, wherein the at least one vertical terminal lead is connected to the laminate substrate by a conductive adhesive.

6. The electronic device of claim 3, wherein a prepreg insulation is disposed between the intermediate layers of the laminate substrate.

7. The electronic device of claim 1, wherein the one or more terminals of the base are configured for surface mounting on the laminate substrate.

8. The electronic device of claim 1, wherein the core and the laminate substrate are inserted into and attached by an adhesive to positioning columns of the base.

9. The electronic device of claim 8, wherein an arc opening is disposed on the positioning columns for dispensing the adhesive to attach the base, the laminate substrate, and the core.

10. An electronic device comprising:

an electrical component;

a base having a first side and a second side opposite the first side, the electrical component coupled to the first side of the base, the base having one or more terminals on the second side to electrically connect to a laminate substrate and configured for surface mounting to the laminate substrate.

11. The electronic device of claim 10, wherein the electrical component is comprised of a core and the laminate substrate, the core comprising a top core section and a bottom core section.

12. The electronic device of claim 11, wherein the laminate substrate has conductive traces, the laminate substrate containing a void to allow for the top and bottom core sections to attach to one another through the void.

13. The electronic device of claim 10, wherein the notch comprises a semi-circular cutout in the laminate substrate comprising conductive material.

14. The electronic device of claim 10, wherein the electrical component is disposed into and attached by an adhesive to position columns of the base.

15. A method of manufacturing an electronic device, the method comprising:

fitting a top core section and a bottom core section of a core through a void of a laminate substrate and around a periphery of the laminate substrate;

mounting at least one of the core and laminate substrate on a first side of a base;

connecting one or more pins on a second side of the base to an external device, the one or more pins comprising a terminal on the second side opposite the first side of the base;

connecting the laminate substrate to at least one vertical terminal lead of the base; and wherein the laminate substrate has a notch for connecting the at least one vertical terminal lead of the base to the laminate substrate.

16. The method of claim 15, further comprising connecting the laminate substrate to the vertical terminal leads of the base by a conductive adhesive.

17. The method of claim 15, further comprising securing the core and laminate substrate to the base with an adhesive.

* * * * *